United States Patent Office 3,150,319
Patented Sept. 22, 1964

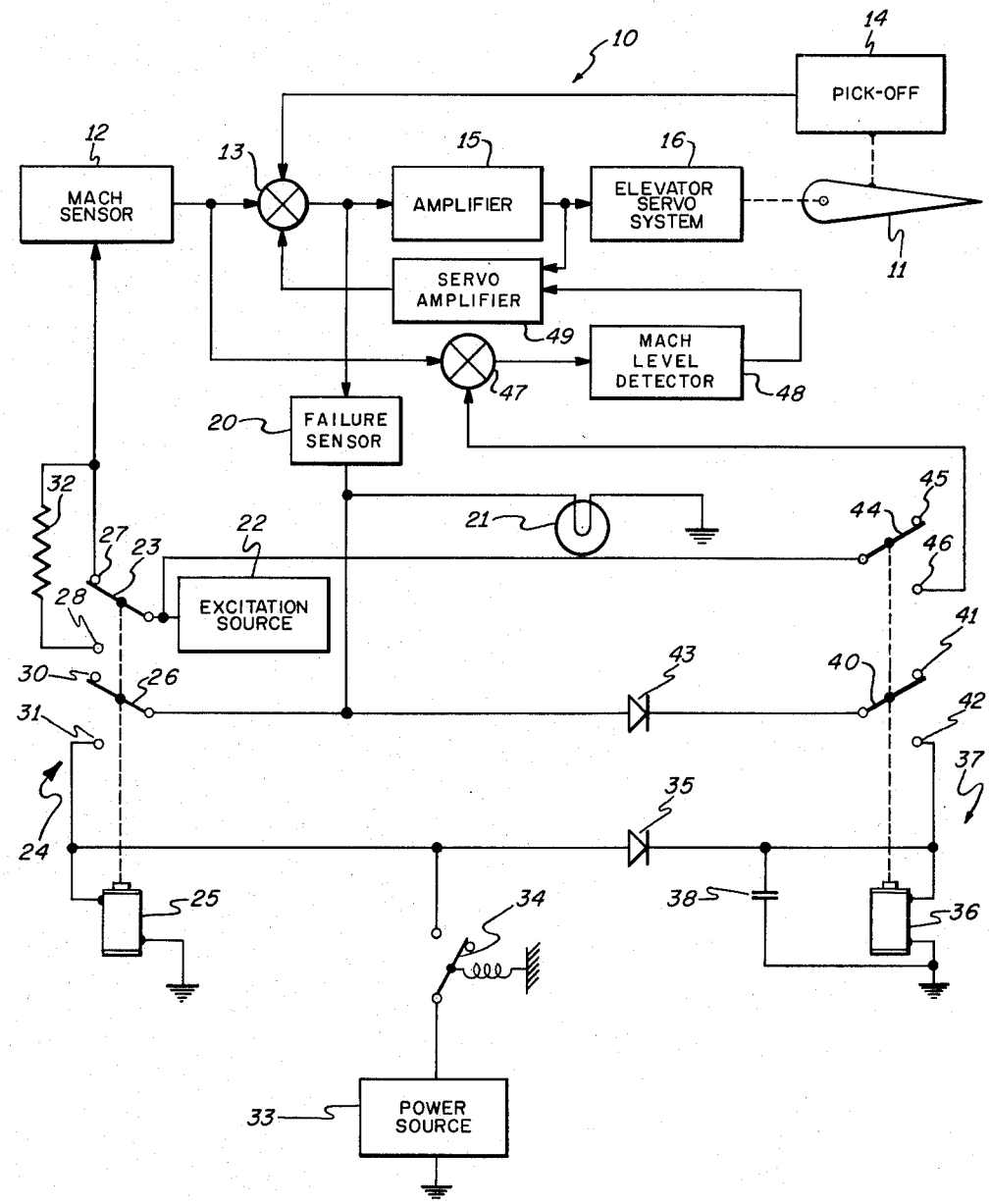

3,150,319
TEST CIRCUIT FOR AUTOMATICALLY CYCLING
A SERVO SYSTEM
Henry E. Hofferber, Phoenix, Ariz., assignor to Sperry Rand Corporation, Great Neck, N.Y., a corporation of Delaware
Filed Mar. 29, 1962, Ser. No. 183,673
4 Claims. (Cl. 324—158)

This invention relates to a test circuit for automatically cycling a servo system to check for proper performance. The invention is particularly applicable to automatically checking an aircraft control surface servo system during a preflight check.

It is desirable when checking an aircraft control surface servo system prior to actual flight that the servo system be controlled to drive the control surface a predetermined number of degrees in one direction and return it to its original position. It is also desirable that all electronic circuitry of the servo system be used during this check to assure proper performance of the entire system during flight. It is also desirable that any additional circuitry required to perform this test be extremely simple, reliable and positive in operation while requiring very little manipulation on the part of the human pilot.

Prior test circuits for this purpose utilize thermal time delay equipment which actuated the servo system for a predetermined length of time. This produced different control surface deflections dependent upon the speed and time constant characteristics of the control surface actuator. Further, the prior art circuits require the pilot to apply a constant voltage in order to completely cycle the control surface. This requires valuable pilot time during preflight checkout of other equipment.

It is therefore a primary object of the present invention to provide a test circuit for automatically checking a servo system that is simple and reliable.

It is another object of the present invention to provide a test circuit for cycling a servo system that functions automatically after initially starting the cycle.

The above objects are achieved by a test circuit which, after power is momentarily applied, automatically varies the error signal to drive the servo system first in one direction and then the other over a predetermined range. Failure of the servo system to complete the full programmed cycle indicates a malfunction.

The single drawing is a wiring schematic of an aircraft servo system incorporating the present invention.

While the invention will be described with respect to an aircraft servo system, it will be realized that the invention is equally applicable to other types of servo systems.

Referring to the drawing, an aircraft servo system 10 is shown which controls the elevator control surface 11 of an aircraft in accordance with control signals generated in a Mach sensor 12. The Mach sensor 12 provides a signal having a magnitude and polarity representative of the amount and direction of the deviation of the aircraft from a predetermined Mach number. The Mach sensor 12 has its output connected to one input terminal of an algebraic summation device 13. The other input terminal of the algebraic summation device 13 is connected to a pick-off 14 which is mechanically connected to the elevator 11 in order to provide a feedback signal representative of the position of the elevator 11. The output signal from the algebraic summation device 13 is the difference between the control signal from the Mach sensor 12 and the feedback signal from the pick-off 14 and it is known as an error signal. The output terminal of the device 13 is connected to an amplifier 15 which in turn is connected to an elevator servo system 16. The elevator servo system 16 is mechanically connected to drive the elevator 11 in accordance with the amplified error signal from the amplifier 15.

A failure sensor 20 is also connected to the output terminal of the algebraic summation device 13. The failure sensor 20 amplifies the error signal and when the error signal exceeds a predetermined magnitude, for example, twice the normal error signal magnitude, the failure senor 20 provides a warning signal to a malfunction warning lamp 21 causing the lamp 21 to glow to indicate a malfuncton in the servo system 10.

To provide excitation current for the Mach sensor 12, an excitation source 22 is normally connected directly to the Mach sensor 12 through the contact arm 23 of a relay 24. The relay 24 includes a holding coil 25 and ganged contact arms 23 and 26. The contact arm 23 cooperates with contacts 27 and 28 while the contact arm 26 cooperates with contacts 30 and 31. A dropping resistor 32 is connected between the contact 28 and the excitation terminal of the Mach sensor 12 to attenuate the excitation current in a manner to be explained.

A power source 33 is connected through a test switch 34 to the coil 25. The test switch 34 is normally spring biased open, i.e. to the right as viewed in the drawing. The power source 33 is also connected through a rectifier 35 to the holding coil 36 of another relay 37. The relay 37 has a condenser 38 connected in parallel with respect to the coil 36. The relay 37 has a contact arm 40 which is cooperative with a blank contact 41 and a contact 42 that connects to the coil 36. The failure sensor 20 is connected to the contact arm 26 and through a rectifier 43 to the contact arm 40. The rectifiers 35 and 43 are poled to conduct in a direction to energize the coil 36. The relay 37 further includes a contact arm 44 which is cooperative with a blank contact 45 and a contact 46 that connects to an algebraic summation device 47. The contact arms 40 and 44 are ganged. The contact arm 44 is connected to the excitation source 22.

The Mach sensor 12 is also connected through the summation device 47 to a Mach level detector 48. The Mach level detector 48 detects the Mach number or level at which automatic trim compensation is required. At speeds below this Mach number, the servo system 10 is maintained in minor loop synchronization by means of a servo assembly 49 thereby keeping the error signal zero. At speeds above this Mach number, the level detector 48 provides a clamping signal to the minor loop servo assembly 49 thereby causing synchronization to occur by way of a control surface change. The relay 37 by means of its contact arm 44 provides a large signal to the level detector 48 during the preflight test in order that minor loop synchronization is prevented and control surface changes must occur for synchronization in a manner to be more fully explained.

Immediately preceding a preflight check, the servo system 10 is in minor loop synchronization. Changes in the output signal of the summation device 13 are amplified by the amplifier 15 and sent to the servo assembly 49 thereby causing the output of the servo assembly 49 to cancel the output of the summation device 13. Because of the fast response time of the servo assembly 49 and the dead zone of the amplifier 15, the control surface 11 is not affected by the output of the summation device 13 until the servo assembly 49 is prevented from rotating by receiving a clamping signal from the level detector 48.

During the preflight check of the aircraft, the pilot momentarily closes the test switch 34 thereby energizing the relays 24 and 37. The contact arms 23, 26, 40 and 44 are in their upward position as shown in the drawing. By energizing the coils 25 and 36, the contact arms 23 and 26 of the relay 24 and the contact arms 40 and 44 of the relay 37 are placed in their downward positions. This connects the excitation source 22 to the summation device 47 through the contact arm 44 thereby causing the level detector 48 to clamp the servo assembly 49. The contact arm 23 connects the excitation source 22 through the dropping resistor 32 to the Mach sensor 12 thereby appreciably reducing the magnitude of the Mach control signal. This large change in the control signal causes a correspondingly large change in the error signal which overcomes the bias on the failure sensor 20 and causes it to provide a warning signal to the malfunction warning lamp 21. The warning signal from the failure sensor 20 also continues to energize the relays 24 and 37 and thus hold the contact arms 23, 26, 40 and 44 in their downward positions.

In response to the amplified error signal from the amplifier 15, the elevator servo system 16 drives the elevator 11 through a predetermined angle determined by the system gain. When the feedback signal from the pick-off 14 reduces the error signal from the output of the device 13 to less than said predetermined value, the failure sensor 20 drops out and no longer provides a warning signal thereby de-energizing the relay 24 and causing its contact arms 23 and 26 to be placed in their normal upward position. The relay 37 remains energized due to the charge on the condenser 38 and continues to hold the contact arms 40 and 44 in their downward positions. The charge on the condenser 38 is prevented from effecting the failure sensor 20 or the relay 24 by the rectifiers 43 and 35 respectively.

When the relay 24 is de-energized, the excitation source 22 is again connected directly to the Mach sensor 12 thereby causing a large control signal of the opposite polarity. This creates a large error signal of the opposite polarity that is amplified and by means of the elevator servo system 16 drives the elevator 11 in the opposite direction. The large error signal again actuates the failure sensor 20 to provide a warning signal to the lamp 21 and to the relay 37 to continue to hold the relay 37 in its energized position. The relay 24 remains unenergized since its contact arm 26 is against a blank contact 30.

The elevator 11 is driven back to its original position and the error signal is gradually reduced by the feedback signal from the pick-off 14. When the error signal reaches said predetermined value, the failure sensor 20 drops out and no longer provides a warning signal to the relay 37. After a time delay determined by the condenser 38, the relay 37 becomes de-energized and its contact arms 40 and 43 are placed in their normal upward positions.

By the above sequence of operations, the servo system 10 has been automatically cycled after the momentary initial pressing of the test switch 34. The sequence shown on the malfunction warning lamp 21 is a warning light during the time the failure sensor 20 provides a warning signal while the elevator 11 is being driven in one direction; no light when the error signal is less than said predetermined value; and a warning light again when the error signal is large and the elevator 11 is being driven in the opposite direction. Failure of the system to complete the full programmed cycle as indicated by the lamp 21 or by the deflection of the elevator 11 indicates a malfunction.

The test circuit of the present invention is particularly applicable to automatic checkout of aircraft servo systems since after the initial pressing of the test switch 34, the pilot is free to continue with preflight tests of other systems. An additional advantage is that the test circuit is independent of the characteristics of the actuator which is normally included in the elevator servo system 10 to provide the power to drive the elevator 11. The characteristics of actuators vary and they are usually different for different airplanes. This system permits the test circuit to provide an indication of the overall system gain which is desirable for actual flight operation.

While the invention has been described in its preferred embodiments it is to be understood that the words which have been used are words of description rather than of limitation and that changes within the purview of the appended claims may be made without departing from the true scope and spirit of the invention in its broader aspects.

What is claimed is:

1. In a test circuit for automatically cycling a servo system comprising:
   (1) a servo system including control signal generating means for providing a control signal, feedback signal generating means for providing a feedback signal and algebraic summation means responsive to said control signal and feedback signal for providing an error signal in accordance with the difference therebetween,
   (2) failure sensing means responsive to said error signal for providing a warning signal when said error signal exceeds a predetermined magnitude,
   (3) first switching means connected to said failure sensing means including means for varying said error signal to thereby exceed said predetermined magnitude,
   (4) second switching means connected to said failure sensing means including means for maintaining said second switching means energized for a predetermined time interval after said error signal is less than said predetermined magnitude,
   (5) said first and second switching means being connected to each other,
   (6) and means connected to said first and second switching means for initially energizing said switching means to initiate a test cycle.

2. A test circuit for automatically cycling a servo system comprising:
   (1) a servo system including control signal generatting means for providing a control signal, feedback signal generating means for providing a feedback signal and algebraic summation means responsive to said control signal and feedback signal for providing an error signal in accordance with the difference therebetween,
   (2) failure sensing means responsive to said error signal for providing a warning signal when said error signal exceeds a predetermined magnitude,
   (3) means for varying said error signal to exceed said predetermined magnitude,
   (4) minor loop servo follow-up means for maintaining said servo system in follow-up,
   (5) clamping means responsive to said control signal and adapted to clamp said minor loop servo follow-up means to prevent said follow-up action when said control signal exceeds a predetermined magnitude,
   (6) first relay means connected to said failure sensing means and having one portion connected to said error signal varying means,
   (7) second relay means connected to said failure sensing means and including means for remaining energized for a predetermined time interval after said error signal is less than said predetermined magnitude,
   (8) means actuated by said second relay means for providing a signal to said clamping means to clamp said minor loop servo follow-up means during a test cycle,
   (9) said first and second relay means being connected by rectifying means poled to conduct in a direction to energize said second relay means only,
   (10) and means for initially energizing said first and second relay means.

3. A test circuit for automatically cycling a servo system comprising:
   (1) a servo system including control signal generating means for providing a control signal, feedback signal generating means for providing a feedback signal and algebraic summation means responsive to said control signal and feedback signal for providing an error signal in accordance with the difference therebetween,
   (2) failure sensing means responsive to said error signal for providing a warning signal when said error signal exceeds a predetermined magnitude,
   (3) an excitation source connected to said control signal generating means,
   (4) minor loop servo follow-up means for maintaining said servo system in follow-up,
   (5) clamping means responsive to said control signal and adapted to clamp said minor loop servo follow-up means to prevent said follow-up action when said control signal exceeds a predetermined magnitude.
   (6) first relay means having first and second switches, said first switch being connected to said excitation source whereby in a first position said excitation source is connected directly to said control signal generating means and in a second position said excitation source is connected to said control signal generating means through an attenuating device which results in an error signal exceeding said predetermined magnitude, said second switch being connected to said failure sensing means and in its second position connects said failure sensing means to energize said first relay means,
   (7) second relay means having third and fourth switches, said third switch being connected to said failure sensing means through rectifying means poled to conduct in a direction to energize said second relay means, said fourth switch being connected to said excitation source whereby with said second relay means energized said excitation source provides a signal to said clamping means to clamp said minor loop servo follow-up means during a test cycle,
   (8) said second relay means including means for maintaining said second relay means energized for a predetermined time interval after said error signal is less than said predetermined magnitude,
   (9) and a power source connected to momentarily energize said first and second relay means, said power source being connected to said second relay means through second rectifying means poled to conduct in a direction to energize said second rectifying means whereby initial energization of said first and second relay means causes said error signal to exceed said predetermined magnitude thereby providing a warning signal from said failure sensing means which causes said servo system to operate in one direction until the error signal goes below said predetermined magnitude and causes said servo system to reverse direction until the system has automatically cycled.

4. A test circuit for automatically checking an aircraft servo system for positioning a control surface comprising:
   (1) an aircraft servo system including control signal generating means for providing a control signal, feedback signal generating means for providing a feedback signal and algebraic summation means responsive to said control signal and feedback signal for providing an error signal in accordance with the difference therebetween,
   (2) failure sensing means responsive to said error signal for providing a warning signal when said error signal exceeds a predetermined magnitude,
   (3) indicating means responsive to said warning signal for providing an indication of a malfunction,
   (4) means for varying said error signal to exceed said predetermined magnitude to simulate a malfunction,
   (5) minor loop servo follow-up means for maintaining said servo system in follow-up,
   (6) clamping means responsive to said control signal and adapted to clamp said minor loop servo follow-up means to prevent said follow-up action when said control signal exceeds a predetermined magnitude,
   (7) a first relay having first and second ganged contact arms and a first holding coil, said first and second contact arms having first and second positions whereby said first position is a normal position and in said second position said means for varying said error signal is rendered operative and said failure sensing means is connected to said first holding coil,
   (8) first and second rectifying means,
   (9) a second relay having third and fourth contact arms, a second holding coil and a condenser in parallel with said second holding coil, said third contact arm having first and second positions whereby said first position is a normal position and in second position said failure sensing means is connected through said rectifying means to said second holding coil, said fourth contact arm having first and second positions whereby said first position is a normal position and in said second position said means for varying said error signal is connected to said clamping means to clamp said minor loop follow-up means during a test cycle,
   (10) and means for momentarily energizing said first and second holding coils thereby placing said contact arms in their second positions for initiating a test cycle.

No references cited.